United States Patent
Mariko et al.

(10) Patent No.: US 11,501,088 B1
(45) Date of Patent: Nov. 15, 2022

(54) TECHNIQUES FOR GENERATING NATURAL LANGUAGE TEXT CUSTOMIZED TO LINGUISTIC PREFERENCES OF A USER

(71) Applicant: YSEOP SA, Lyons (FR)

(72) Inventors: Dominique Mariko, Paris (FR); Hanna Abi-Akl, Paris (FR); Hugues Sézille de Mazancourt, Thiais (FR)

(73) Assignee: YSEOP SA, Lyons (FR)

( * ) Notice: Subject to any disclaimer, the term of this patent is extended or adjusted under 35 U.S.C. 154(b) by 272 days.

(21) Appl. No.: 16/815,205

(22) Filed: Mar. 11, 2020

(51) Int. Cl.
| | |
|---|---|
| *G06F 40/56* | (2020.01) |
| *G06F 16/9035* | (2019.01) |
| *G06F 40/35* | (2020.01) |
| *G06F 40/58* | (2020.01) |

(52) U.S. Cl.
CPC .......... *G06F 40/56* (2020.01); *G06F 16/9035* (2019.01); *G06F 40/35* (2020.01); *G06F 40/58* (2020.01)

(58) Field of Classification Search
CPC ............. G10L 15/00; G06F 3/00; G06F 40/00
See application file for complete search history.

(56) References Cited

U.S. PATENT DOCUMENTS

| | | | |
|---|---|---|---|
| 7,412,385 B2 | 8/2008 | Brockett et al. | |
| 7,546,235 B2 | 6/2009 | Brockett et al. | |
| 7,552,046 B2 | 6/2009 | Brockett et al. | |
| 7,584,092 B2 | 9/2009 | Brockett et al. | |
| 7,673,249 B2 * | 3/2010 | Awada | G06F 9/451 |
| | | | 715/810 |
| 8,204,842 B1 | 6/2012 | Zhang et al. | |
| 8,825,474 B1 * | 9/2014 | Zhai | G06F 40/237 |
| | | | 704/4 |
| 9,135,244 B2 | 9/2015 | Reiter | |
| 9,223,497 B2 * | 12/2015 | Pasquero | G06F 40/274 |
| 9,448,989 B2 * | 9/2016 | Akama | G06F 3/0237 |
| 9,996,524 B1 * | 6/2018 | Hwang | H04W 4/14 |
| 10,331,793 B2 * | 6/2019 | Dotterer | G06F 40/47 |
| 10,339,470 B1 | 7/2019 | Dutta et al. | |

(Continued)

OTHER PUBLICATIONS

International Search Report and Written Opinion for International Application No. PCT/IB2020/000359 dated Sep. 15, 2020.
Danlos et al., EasyText: an operational NLG system. Proceedings of the 13th European Workshop on Natural Language Generation (ENLG). 2011:139-144.

(Continued)

*Primary Examiner* — Neeraj Sharma
(74) *Attorney, Agent, or Firm* — Wolf, Greenfield & Sacks, P.C.

(57) ABSTRACT

Described herein are techniques for generating natural language text customized to linguistic preferences of a user. Customizing the generation of natural language text to the linguistic preference of a user can significantly improve the overall user experience. Some embodiments relate to techniques for learning the linguistic preferences of a user, and for assisting NLG systems to generate natural text that reflects more closely the linguistic preferences of the user. A linguistic preference learner can present different natural language options to a user, and can ask the user to select the option that or appears to reflect more closely the user's personal linguistic preferences. The Linguistic preference learner may determine, based on the user selection, information relating to what linguistic characteristics the user appears to prefer.

20 Claims, 10 Drawing Sheets

(56) References Cited

U.S. PATENT DOCUMENTS

| | | | |
|---|---|---|---|
| 10,943,072 B1 | 3/2021 | Jaganmohan | |
| 11,210,473 B1 | 12/2021 | Mariko et al. | |
| 2005/0114122 A1* | 5/2005 | Uhrbach | G10L 15/06 |
| | | | 704/220 |
| 2006/0009966 A1 | 1/2006 | Johnson et al. | |
| 2006/0245641 A1 | 11/2006 | Viola et al. | |
| 2007/0055491 A1 | 3/2007 | Manson et al. | |
| 2009/0287476 A1 | 11/2009 | Johnson et al. | |
| 2011/0184727 A1 | 7/2011 | Connor | |
| 2014/0108304 A1 | 4/2014 | Heidasch | |
| 2014/0156264 A1 | 6/2014 | Etzioni et al. | |
| 2014/0188891 A1 | 7/2014 | Nath et al. | |
| 2014/0310639 A1* | 10/2014 | Zhai | G06F 3/0484 |
| | | | 715/780 |
| 2014/0358519 A1* | 12/2014 | Mirkin | G06F 40/47 |
| | | | 704/2 |
| 2015/0089409 A1 | 3/2015 | Asseily et al. | |
| 2015/0169547 A1 | 6/2015 | Reiter | |
| 2016/0162166 A1* | 6/2016 | Kleine-Horst | G06F 40/166 |
| | | | 715/762 |
| 2016/0364377 A1* | 12/2016 | Krishnamurthy | G06F 40/35 |
| 2017/0357636 A1 | 12/2017 | Shafiulla et al. | |
| 2018/0032505 A1 | 2/2018 | Hoetzer et al. | |
| 2018/0143956 A1* | 5/2018 | Skarbovsky | G06F 40/166 |
| 2018/0217976 A1* | 8/2018 | Hwang | G06F 40/242 |
| 2018/0300311 A1 | 10/2018 | Krishnamurthy | |
| 2019/0311039 A1 | 10/2019 | Plant et al. | |
| 2020/0057798 A1* | 2/2020 | Ragan, Jr. | G06F 40/166 |
| 2020/0142964 A1* | 5/2020 | Rodriguez Bravo | G09B 19/06 |
| 2020/0184959 A1 | 6/2020 | Yasa et al. | |
| 2020/0201897 A1 | 6/2020 | Palanciuc et al. | |
| 2020/0233928 A1 | 7/2020 | Hane et al. | |
| 2020/0356732 A1 | 11/2020 | Salmon et al. | |
| 2020/0380075 A1 | 12/2020 | Boada et al. | |
| 2020/0410011 A1 | 12/2020 | Shi et al. | |

OTHER PUBLICATIONS

Lafferty et al., Conditional random fields: Probabilistic models for segmenting and labeling sequence data. Proceedings of the Eighteenth International Conference on Machine Learning (ICML). 2001:282-289.

Reiter, Has a consensus NL generation architecture appeared, and is it psycholinguistically plausible?. ArXiv preprint cmp-lg/9411032. Nov. 30, 1994:1-9.

Silberztein, Syntactic parsing with NooJ. HAL archives-ouvertes. Jul. 6, 2010:1-14.

Vaswani et al., Attention is all you need. ArXiv preprint arXiv:1706.03762v5. Dec. 6, 2017;5:1-15.

Jager et al., Formal language theory: refining the Chomsky hierarchy. Philosophical Transactions of the Royal Society B: Biological Sciences. Jul. 19, 2012;367(1598):1956-70.

Oard et al., Implicit feedback for recommender systems. Proceedings of the AAAI workshop on recommender systems Jul. 27, 1998:81-83.

Reinanda et al., Performance Comparison of Learning to Rank Algorithms for Information Retrieval. 2014 International Conference on Information, Communication Technology and System. 2014:3 pages. https://www.semanticscholar.org/paper/Performance-Comparison-of-Learning-to-Rank-for-Reinanda-Widyantoro/cd12e191d2c2790e5ed60e5186462e6f8027db1f?citingPapersSort=relevance&citingPapersLimit=10&citing PapersOffset=0&year%5B0%5D=&year%5B1%5D=&citedPapersSort=relevance&citedPapersLimit=10&citedPapersOffset=10#paper-header [last access Sep. 4, 2020].

Roche et al., Finite-state language processing. MIT press. 1997. 474 pages.

U.S. Appl. No. 16/868,685, filed May 7, 2020, Salmon et al.

U.S. Appl. No. 16/816,475, filed Mar. 12, 2020, Mariko et al.

PCT/IB2020/000359, Sep. 15, 2020, International Search Report and Written Opinion.

* cited by examiner

1. Corporation A's spendable cash and investments to total debt is moderate at 0.98x and has remained flat over the last five fiscal years as a result of a stagnation in debt.

2. Corporation A's moderate spendable cash and investments to total debt of 0.98x was flat over the last five fiscal years due to total debt that remained stable.

3. Corporation A's spendable cash and investments to total debt is moderate at 0.98x and has stayed stable over the last five fiscal years in a stagnation in total debt.

4. Corporation A's spendable cash and investments to total debt is moderate at 0.98x and flat over the last five fiscal years as a result of a stagnation in total debt.

5. Corporation A's spendable cash and investments to total debt is moderate at 0.98x and has stayed stable over the last five fiscal years due to a stagnation in debt.

| Variable 1 | Variable 2 | Variable 3 | Variable 4 | Variable 5 | Variable 6 | Variable 7 | Variable 8 | Variable 9 | Variable 10 | Variable 11 |
|---|---|---|---|---|---|---|---|---|---|---|
| Value 1 | Value 2 | Value 3 | Value 4 | Value 5 | Value 6 | Value 7 | Value 8 | Value 9 | Value 10 | Value 11 |

FIG. 5B

| Number of Complex Nouns | Verb To Be | Auxiliary Verbs | Conjunction | Pronoun | Preposition | Begins with Pronoun | Begins with Interrogative | Begins with Article | Begins with Subordination | Begins with Conjunction | Begins with Preposition | Wh-Determiners | Past Tense | Present Tense |
|---|---|---|---|---|---|---|---|---|---|---|---|---|---|---|
| 1 | 1 | 0 | 0 | 0 | 0 | 0 | 0 | 0 | 0 | 0 | 0 | 1 | 0 | 1 |

| | Scores |
|---|---|
| Corporation A's strategic positioning score is very poor and highlights the lack of meaningful detailed operational and financial planning and forecasting. | 2.9285714285714 |
| Corporation A has a very poor strategic positioning score, which highlights the lack of meaningful detailed operational and financial planning and forecasting. | 2.5594285714285 |
| Corporation A's strategic positioning score is very poor and is indicative of limited meaningful academic program review and adjustments. | 2.8358714285714 |
| Corporation A's very poor strategic positioning score highlights the lack of meaningful detailed operational and financial planning and forecasting. | 2.3415857142857 |
| Corporation A's very very poor strategic positioning score is indicative of limited meaningful academic program review and adjustments. | 2.2851428571428 |

FIG. 6

| Variables → | Number of words | Number of compound words | Verb: to Be | Auxiliary Verbs | Conjunction | Pronoun | Preposition | Begins with Pronoun | Begins with Interrogative | Begins with Action | Begins with Subordination | Begins with Conjunction | Begins with Preposition | w/o Sentenceness | Past Tense | Present Tense |
|---|---|---|---|---|---|---|---|---|---|---|---|---|---|---|---|---|
| Prior values → | 1 | 1 | 0 | 0 | 1 | 0 | 1 | 0 | 0 | 0 | 0 | 0 | 0 | 1 | 0 | 1 |
| Current values → | 1 | 1 | 0 | 0 | 1 | 0 | 1 | 0 | 0 | 0 | 0 | 0 | 0 | 0 | 0 | 0 |
| Updated values | 2 | 2 | 0 | 0 | 2 | 0 | 2 | 0 | 0 | 0 | 0 | 0 | 0 | 1 | 0 | 1 |

FIG. 7

TECHNIQUES FOR GENERATING NATURAL LANGUAGE TEXT CUSTOMIZED TO LINGUISTIC PREFERENCES OF A USER

FIELD

The techniques described herein relate to the field of automatic generation of natural language text, and more particularly to techniques for generating natural language text customized to linguistic preferences of a user.

BACKGROUND

Natural language generation (NLG) is the generation of human-language text (i.e., text in a human language) based on information in non-linguistic form. For example, natural language generation techniques may be used to generate a report for a business based on financial data about the business, to generate a textual description of a day of trading of a particular stock based on data indicating the price of the stock throughout the day, to generate a confirmation e-mail for an online purchase made via the Internet based on data describing the purchase, to generate real-time comments about a sporting event using data about the game, or to generate text for a chatbot for communicating with a customer based on data about the customer.

SUMMARY

Some embodiments relate to a method for generating natural language text customized to linguistic preferences of a user. The method comprises using at least one computer hardware processor to perform: determining linguistic preferences of the user at least in part by: accessing a first plurality of natural language text segments; accessing current values for a plurality of variables representing the linguistic preferences of the user; presenting, to the user, a first graphical user interface (GUI) comprising a first plurality of selectable GUI elements, each of at least some of the first plurality of selectable GUI elements being associated with a corresponding natural language text segment in the first plurality of natural language text segments; obtaining, via the first GUI, a first selection made by the user of at least one of the first plurality of selectable GUI elements in the first GUI; determining a respective first score for each of at least some of the first plurality of natural language text segments to obtain first scores, the determining performed using: the first selection, and at least one of the current values for the plurality of variables representing the linguistic preferences of the user; and determining updated values for the plurality of variables representing the linguistic preferences of the user using the first scores and at least some of the current values; generating natural language text customized to the user using the updated values; and outputting the natural language text customized to the user.

Some embodiments relate to a system for generating natural language text customized to linguistic preferences of a user. The system comprises at least one computer hardware processor to perform: determining linguistic preferences of the user at least in part by: accessing a first plurality of natural language text segments; accessing current values for a plurality of variables representing linguistic preferences of the user; presenting, to the user, a first graphical user interface (GUI) comprising a first plurality of selectable GUI elements, each of at least some of the first plurality of selectable GUI elements being associated with a corresponding natural language text segment in the first plurality of natural language text segments; obtaining, via the first GUI, a first selection made by the user of at least one of the first plurality of selectable GUI elements in the first GUI; determining a respective first score for each of at least some of the first plurality of natural language text segments to obtain first scores, the determining performed using: the first selection, and at least one of the current values for the plurality of variables representing linguistic preferences of the user; and determining updated values for the plurality of variables representing the linguistic preferences of the user using the first scores and at least some of the current values; generating natural language text customized to the user using the updated values; and outputting the natural language text customized to the user.

Some embodiments relate to at least one non-transitory computer-readable storage medium storing processor-executable instructions that, when executed by at least one processor, cause the at least one processor to perform a method for generating natural language text customized to linguistic preferences of a user. The method comprises determining a plurality of linguistic preferences of the user at least in part by: determining linguistic preferences of the user at least in part by: accessing a first plurality of natural language text segments; accessing current values for a plurality of variables representing linguistic preferences of the user; presenting, to the user, a first graphical user interface (GUI) comprising a first plurality of selectable GUI elements, each of at least some of the first plurality of selectable GUI elements being associated with a corresponding natural language text segment in the first plurality of natural language text segments; obtaining, via the first GUI, a first selection made by the user of at least one of the first plurality of selectable GUI elements in the first GUI; determining a respective first score for each of at least some of the first plurality of natural language text segments to obtain first scores, the determining performed using: the first selection, and at least one of the current values for the plurality of variables representing linguistic preferences of the user; and determining updated values for the plurality of variables representing the linguistic preferences of the user using the first scores and at least some of the current values; generating natural language text customized to the user using the updated values; and outputting the natural language text customized to the user.

The foregoing is a non-limiting summary of the invention, which is defined by the attached claims.

BRIEF DESCRIPTION OF DRAWINGS

Various aspects and embodiments of the disclosure provided herein are described below with reference to the following figures. Items appearing in multiple figures are indicated by the same or a similar reference number in all the figures in which they appear.

FIG. 3 illustrates a plurality of natural language text segments, in accordance with some embodiments of the technology described herein.

FIG. 5A illustrates a generic data structure including a plurality of variables representing linguistic preferences associated with a user and respective values, in accordance with some embodiments of the technology described herein.

FIG. 5B illustrates a specific data structure including a plurality of variables representing linguistic preferences associated with a user and respective values, in accordance with some embodiments of the technology described herein.

FIG. 6 illustrates a plurality of natural language text segments and corresponding scores, in accordance with some embodiments of the technology described herein.

FIG. 7 illustrates a data structure including updated values for a plurality of variables representing linguistic preferences associated with a user, in accordance with some embodiments of the technology described herein.

DETAILED DESCRIPTION

I. Overview

Figure 1A:
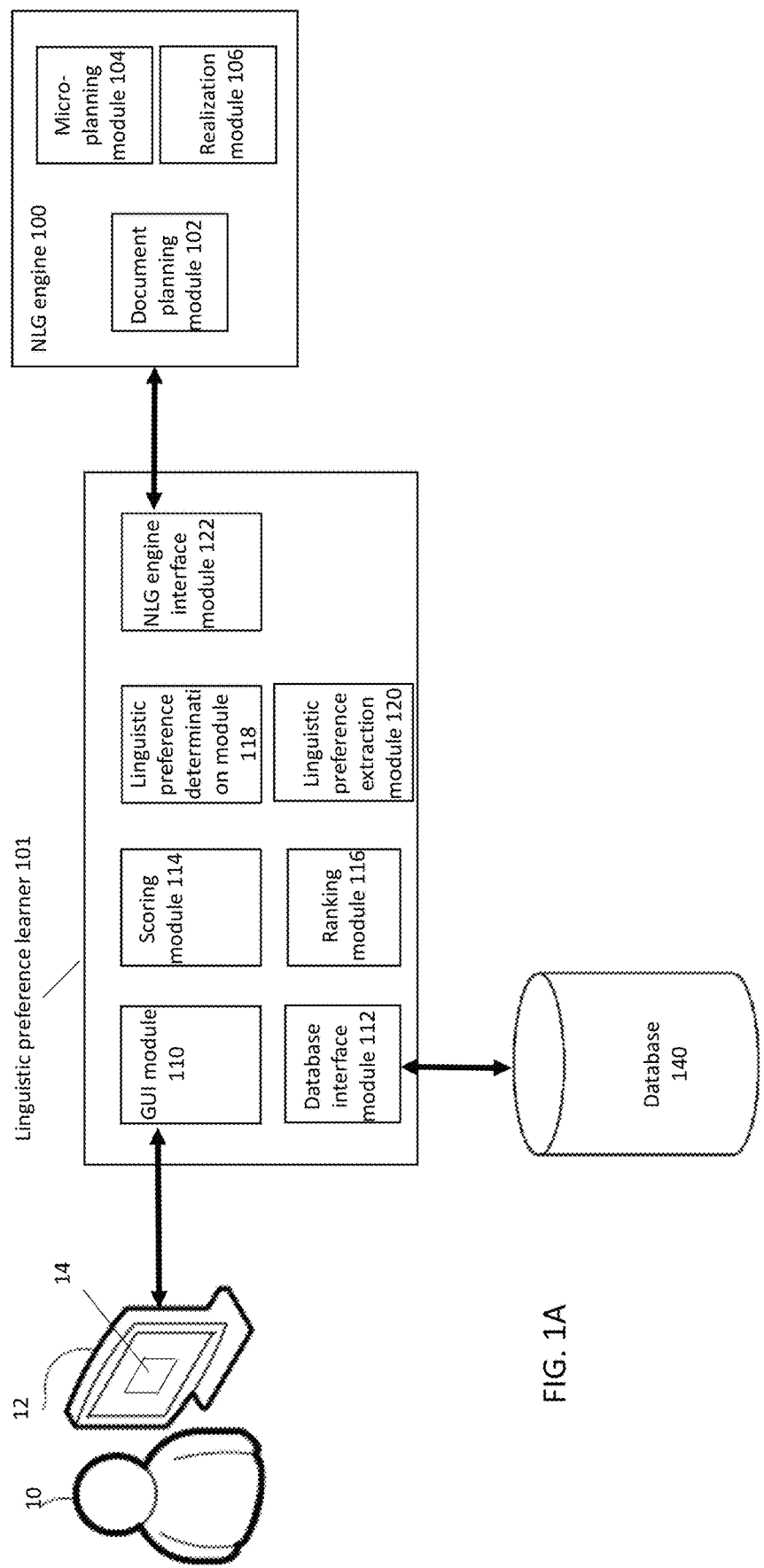
FIG. 1A is a diagram illustrating a system for natural language text generation including a natural language generation system, a database and a linguistic preference learner, in accordance with some embodiments of the technology described herein.

Described herein are techniques for generating natural language text customized to linguistic preferences of a user. Conventional NLG engines can generate text describing a certain set of facts in a myriad of different ways, whether because of different grammatical constructions, syntactical structures, or vocabularies, for example. The same set of facts may be described using different synonyms, verb tenses and voices (active or passive), using long sentences including commas and semicolons, or using shorter sentences separated by periods. For example, a conventional NLG system may generate any of the following sentences to inform users of recent stock market fluctuations: (1) the stock market has experienced significant fluctuations since August due to uncertainty in supply and demand, (2) supply and demand continue to be unpredictable; as a result, the stock market has been on a rollercoaster since August, and (3) unpredictability in supply and demand have caused major instabilities in the stock market since August.

The inventors have recognized that some conventional NLG systems, when generating natural language text, often use arbitrary criteria when choosing certain linguistic features over others. In the example above, three options are available to the NLG system to express the proposition: "uncertainty in supply and demand," "supply and demand continue to be unpredictable" and "unpredictability in supply and demand." In some conventional NLG systems, there are no particular criteria for choosing among these options other than generating text based on predefined rules.

Yet, different individuals have different linguistic preferences. Further, individuals tend to write in relatively consistent and unique ways. Each individual has a unique vocabulary, sometimes rich, sometimes limited. Some individuals use long sentences, other individuals use shorter sentences. Different individuals use function words (e.g., prepositions, articles and conjunctions) in very different ways. Different individuals use punctuation in very different ways.

The inventors have recognized that it would be beneficial to be able to customize the generation of natural language text to the linguistic preferences of different users. First, customization of NLG would significantly improve the overall user experience, as each user would receive text tailored to his/her personal linguistic taste.

Second, customization of NLG would improve the usability of existing NLG systems, thus reducing their development and maintenance costs. Some conventional NLG systems are highly specialized for use in particular contexts or in particular industries. As a result, these NLG systems lack flexibility and cannot be easily adapted to other contexts and industries. This makes specialized NLG systems particularly costly, as adapting an existing NLG system to a new user may require substantial redevelopment.

The inventors have developed techniques for customizing the natural language generated by NLG systems to a user's preference. In some embodiments, such techniques may be implemented using a software tool referred to herein as a "linguistic preference learner." A linguistic preference learner presents a user with an interactive GUI interface through which it interacts with the user and learns the user's linguistic preferences. The linguistic preference learner uses the learned linguistic preferences to assist a NLG system in customizing natural language text to be presented to a user.

In some embodiments, a linguistic preference learner can assist an NLG system in generating natural language text using one of two distinct approaches. The first approach involves using an NLG system to generate multiple natural language text options each describing the same set of underlying facts, and using the linguistic preference learner to select the option that matches more closely the linguistic preference of a user. Once the selection has been made and communicated to the NLG system, the NLG system generates and outputs natural language text including the selected option. For example, an NLG system may generate the sentences (1), (2) and (3) provided above. A linguistic preference learner may learn that a particular user favors figurative language, and may select sentence (2) because of the language "the stock market has been on a rollercoaster." Accordingly, the NLG system may generate output text including sentence (2).

The second approach involves assisting an NLG system using the linguistic preferences of a user from the generation stage. Instead of using the NLG system to generate a number of options as in the first approach, the natural language text that the NLG system generates already reflects the linguistic preferences of a user. Consider for example a scenario in which an NLG system informs a user of an accident involving an automobile and a motorbike. A linguistic preference learner may learn that the user prefers that verbs be conjugated in the active voice, and may communicate this information to an NLG system. Further, the linguistic preference learner may learn that the user prefers the noun "car" over the noun "automobile." Using this information, the NLG system may generate the following sentence "the car ran a red light and hit the motorbike." Accordingly, instead of generating natural language text making arbitrary linguistic choices, which in the example above might have resulted in a sentence conjugating the verb "to hit" in the passive voice or using the noun "automobile," the generated natural language text is consistent with the user's preferences.

Accordingly, in some embodiments, the inventors have developed natural language generation techniques that involve: (1) determining linguistic preferences of the user; (2) generating natural language text customized to the user using the updated values; and (3) outputting the natural language text customized to the user. Determining linguistic preferences of the user may involve (A) accessing a first plurality of natural language text segments (e.g., sentences), (B) accessing current values for a plurality of variables representing the linguistic preferences of the user, (C) presenting, to the user, a first graphical user interface (GUI) comprising a first plurality of selectable GUI elements, each of at least some of the first plurality of selectable GUI elements being associated with a corresponding natural language text segment in the first plurality of natural language text segments, (D) obtaining, via the first GUI, a first selection made by the user of at least one of the first plurality of selectable GUI elements in the first GUI, (E) determining a respective first score for each of at least some of the first plurality of natural language text segments to obtain first scores, the determining performed using the first selection and at least one of the current values for the plurality of variables representing the linguistic preferences of the user, and (F) determining updated values for the plurality of variables representing the linguistic preferences of the user using the first scores and at least some of the current values.

In some embodiments, generating the natural language text involves: (A) receiving, from a natural language generation (NLG) system, a second plurality of natural language text segments, (B) selecting at least one text segment from the second plurality of natural language segments using the updated values for the plurality of variables representing linguistic preferences of the user, and (C) including the at least one text segment in the natural language text.

In some embodiments, generating the natural language text involves: (A) providing the updated values for the plurality of variables representing linguistic preferences of the user to a natural language generation (NLG) system, (B) and generating, with the NLG system and using the updated values for the plurality of variables representing linguistic preferences of the user, the natural language text.

In some embodiments, determining the plurality of linguistic preferences of the user further involves, prior to generating the natural language text customized to the user: (A) presenting, to the user, a second GUI comprising a second plurality of selectable GUI elements, each of at least some of the second plurality of selectable GUI elements being associated with a corresponding natural language text segment in a second plurality of natural language text segments different from the first plurality of natural language text segments, (B) obtaining, via the second GUI, a second selection made by the user of at least one of the second plurality of selectable GUI elements in the second GUI, and (C) determining a respective second score for each of at least some of the second plurality of text segments using the second selection, and at least one of the updated values for the plurality of variables representing linguistic preferences of the user. Furthermore, determining updated values for the plurality of variables representing the linguistic preferences of the user may be performed also using the second scores.

In some embodiments, each of the first plurality of natural language text segments represents a first fact pattern and each of the second plurality of natural language text segments represents a second fact pattern different from the second fact pattern.

In some embodiments, the plurality of variables represent at least one linguistic preference selected among the group consisting of a typographic preference, a syntactic preference, and a lexical preference.

In some embodiments, the plurality of variables represent at least one linguistic preference selected among the group consisting of a number of syllables per word, a number of characters per word, a number of words per sentence, a number of characters per sentence, a number of words beginning with a vowel per sentence, a number of lines per sentence, a number of irregular words, a number of verbs expressed in past tense, a number of verbs expressed in present tense, and a frequency of words appearing at least twice in a same sentence.

In some embodiments, the current values for the plurality of variables representing linguistic preferences of the user are stored in a data structure associated with the user, the data structure comprising a set of fields storing the current values.

In some embodiments, determining updated values for the plurality of variables representing the linguistic preferences of the user involves (A) selecting a subset of the first plurality of text segments using the at least some of the first scores, and (B) updating, using the selected subset of text segments, at least some of the current values to obtain updated values for the plurality of variables representing linguistic preferences of the user.

In some embodiments, selecting a subset of the first plurality of text segments using the at least some of the first scores involves selecting the text segments having the highest N scores, with N>1.

In some embodiments, determining updated values for the plurality of variables representing the linguistic preferences of the user involves counting frequencies with which each of at least some of the selected subset of text segments satisfies the linguistic preferences of the user.

Some of the techniques described herein need not rely on computationally-demanding machine learning algorithms to learn the linguistic preferences of a user—whereby a computer is trained with vast amounts of data containing for example text written by a user to identify linguistic patterns specific to that particular user. The inventors have recognized that learning the linguistic preferences of a user in this manner may be too computationally burdensome to be practical. The requirement for computational resources would further increase if it is desired to learn the linguistic preferences of many users, not just one user. The techniques developed by the inventors, including the graphical user interfaces described herein, allow NLG systems to learn the linguistic preferences of a user (or several users) using fewer computational resources (e.g., processors, memory, network) than computationally-demanding machine learning algorithms, which constitutes an improvement to NLG systems and to computer-related technology.

Following below are more detailed descriptions of various concepts related to, and embodiments of, learning the linguistic preferences of a user and generating natural language text based on the learned linguistic preferences. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

II. Systems and Processes for Generating Customized Natural Language Text

FIG. 1A is a diagram illustrating a system for natural language generation including a NLG system 100, a linguistic preference learner 101 and a database 140. NLG system 100 comprises software modules configured to analyze structured data and, building upon the data, generate natural language text. Linguistic preference learner 101 comprises one or more software modules configured to learn information about linguistic preferences of users and to assist NLG system 100 to generate natural language text that is customized to the linguistic preferences of a particular user. Database 140 maintains the information that linguistic preference learner 101 has learned about the users.

Linguistic preference learner 101 includes a GUI module 110, a database interface module 112, a scoring module 114, a ranking module 116, a linguistic preference determination module 118, a linguistic preference extraction module 120 and an NLG system interface module 122. GUI module 110 enables communication with GUIs that may presented to users. In the diagram of FIG. 1A, user 10 interacts with a GUI 14 presented in a computing system 12. GUI 14 is in communication with GUI module 110. For example, GUI module 110 may present different natural language text options describing the same set of facts to user 12, and may ask the user to select the option that appears to reflect more closely the user's personal linguistic taste. When a user 10 makes a selection, GUI 14 may communicate the selection to GUI module 110.

Database interface module 112 is in communication with database 140. Database 140 stores information that may be used in natural language generation. Database 140 may store data structures including variables representing linguistic preferences of users and values associated with the variables. Variables that may be stored in database 140 include variables representing typographic preferences, grammatical preferences, semantic preferences, syntactic preferences, and lexical preferences. The values associated with the variables may provide a numeric indication as to the degree to which a user prefers each linguistic feature. For example, for a particular user, a value equal to may be associated with the variable "present tense" and a value equal to 8 may be associated with the variable "past tense." The fact that the first value is greater than the second value indicates that the user prefers that verbs be conjugated in the present tense over the past tense. Database interface module 112 may be configured to write, update, read or delete the content of the data structures of database 140.

Scoring module 114 performs scoring procedures. For example, scoring module 114 may assign scores to natural language text segments presented as options to user 10 based on the user's selection and, if available, current values for variables representing linguistic preferences stored in database 140. Ranking module 116 ranks text segments presented to the user based on their scores.

Linguistic preference determination module 118 determines the linguistic preferences of a user. Linguistic preference determination module 118 may perform these procedures using scores assigned to text segments by scoring module 114 and/or the relative ranking assigned the text segments by ranking module 116. In some embodiments, the linguistic preference determination may be made using also current values for the variables representing linguistic preferences of a user, if available.

Linguistic preference extraction module 120 determines what linguistic preferences should be considered as part of a learning process with a user. Considering all the possible linguistic preferences may be redundant in some embodiments. Certain linguistic preferences are likely to significantly impact how natural language text is ultimately generated. Other linguistic preferences, however, may have a limited impact. Unfortunately, linguistic preference learner 101 may not know a priori which linguistic preferences are likely to have a significant impact. Linguistic preference extraction module 120 may be configured to determine what particular linguistic preferences are likely to have a significant impact, so that only those linguistic preferences are considered upon receiving a user selection. Thus, linguistic preference extraction module 120 informs what linguistic preferences linguistic preference determination module 118 needs to consider. Specific implementations of linguistic preference extraction module 120 are described in detail in section III.

Building upon the linguistic preferences learned about a particular user, NLG system interface module 122 assists NLG system 100 to generate and output natural language text that is customized to a user. NLG system interface module 122 can assist NLG system 100 in generating natural language text using at least two distinct approaches. The first approach involves using an NLG system to generate a number of natural language options each describing the same set of facts, and using the linguistic preference learner to select the option that matches more closely the linguistic preference of a user. The selection may be performed without further input from the user. The second approach involves assisting an NLG system using the linguistic preferences of a user from the generation stage.

NLG system 100 may transform information in non-linguistic form into human language text using multiple stages of processing. NLG system 100 includes a document planning module 102, a micro-planning module 104 and a realization module 106. Document planning module 102 performs a document planning stage, micro-planning module 104 performs a micro-planning stage and realization module 106 performs a realization stage. Linguistic preference learner 101 may assist NLG system 100 in any one of the NLG stages.

Figure 1B:
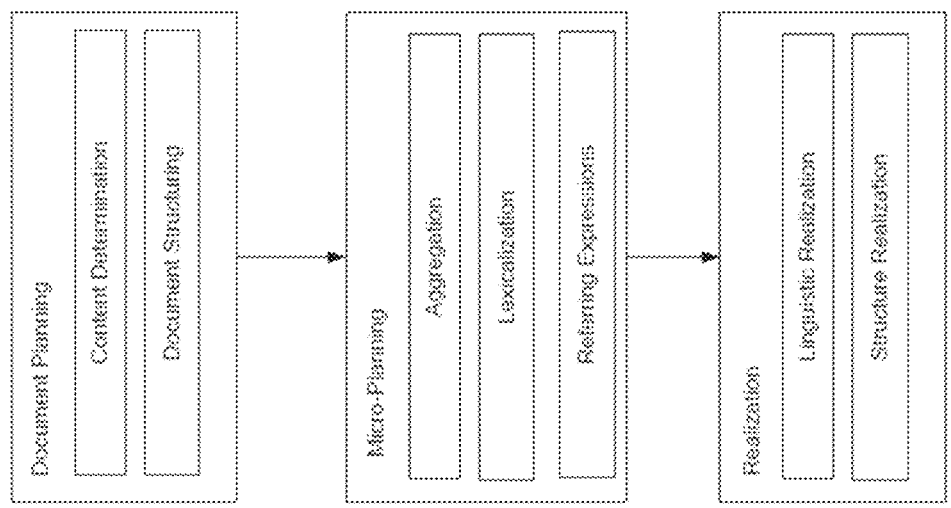
FIG. 1B is a diagram illustrating processing stages of natural language generation, in accordance with some embodiments of the technology described herein.

As further illustrated in FIG. 1B, the document planning stage may include a content determination stage and a document structuring stage. In the content determination stage, NLG system 100 may obtain content to be expressed in natural language text. In the document structuring stage, NLG system 100 may determine the rhetorical structure of the text to be generated. For example, to generate natural language text about the weather, information about the weather may be obtained in the content determination stage (e.g., information indicating the temperature and information indicating the likelihood of rain) and organized for presentation in the document structuring stage (e.g., by determining that information indicating the likelihood of rain should be presented before information indicating the temperature). In some embodiments, linguistic preference learner 101 assists NLG system 100 in the document structuring stage. For example, linguistic preference learner 101 may learn that a particular user prefers reading information about profits before reading information about losses, and may communicate this information to document planning module 102. Document planning module 102 organizes how financial information will be presented accordingly.

Micro-planning module 104 performs a micro-planning stage of NLG which may involve determining, based at least in part on the document plan, a syntactic structure for the text to be generated. The micro-planning stage may include an aggregation stage, a lexicalization stage, and a referring expression stage. The aggregation stage may involve determining boundaries between sentences. In some embodiments, linguistic preference learner 101 assists NLG system 100 in the aggregation stage. For example, linguistic preference learner 101 may learn that a particular user prefers short sentences separated by periods and with few commas over long sentences including many commas. Micro-planning module 104 may use the information learned by linguistic preference learner 101 to determine the boundaries between sentences.

The lexicalization stage may involve choosing words to describe particular concepts to be expressed in the text to be generated. In some embodiments, linguistic preference learner 101 assists NLG system 100 in the lexicalization stage. For example, linguistic preference learner 101 may learn that a particular user prefers that a temperature of 80 degrees may described as "warm," not "hot". Micro-planning module 104 may use the information learned by linguistic preference learner 101 to select particular terms over others.

The referring expression stage may involve selecting expressions, for use in the text to be generated, to refer to concepts that appear more than once in the text (e.g., selecting the pronoun "it" to refer to "the weather" in a portion of the text to be generated). In some embodiments, linguistic preference learner 101 assists NLG system 100 in the referring expression stage. For example, linguistic preference learner 101 may learn that a particular user prefers using the same word numerous times in a sentence that replacing the word with pronouns. Micro-planning module 104 may use the information learned by linguistic preference learner 101 to decide whether to replace a word with a pronoun and which particular pronouns to use.

Realization module 106 performs a realization stage of NLG which may involve transforming the syntactic structure of the document to be generated into text. The realization stage includes a linguistic realization stage and a structural realization stage. The linguistic realization stage may involve generating actual text according to rules of syntax, morphology, and orthography, and may include putting words in order, conjugating verbs, ensuring adjective-noun agreement, etc. In some embodiments, linguistic preference learner 101 assists NLG system 100 in the linguistic realization stage. For example, linguistic preference learner 101 may learn that a particular user prefers sentences that begin with pronouns over sentences that begin with articles and that the user prefers sentences that begin with prepositions over sentences that begin with interrogatives. Realization module 106 may use the information learned by linguistic preference learner 101 to decide how to apply rules of syntax, morphology, and orthography to the text being generated.

During the structural realization stage, the text generated in the linguistic realization stage may be output in a desired format (e.g., a PDF file, an XML file, etc.). The above-described tasks may be performed by NLG system 100 sequentially in stages, as shown in FIG. 1B, or in any other suitable way.

Figure 2:
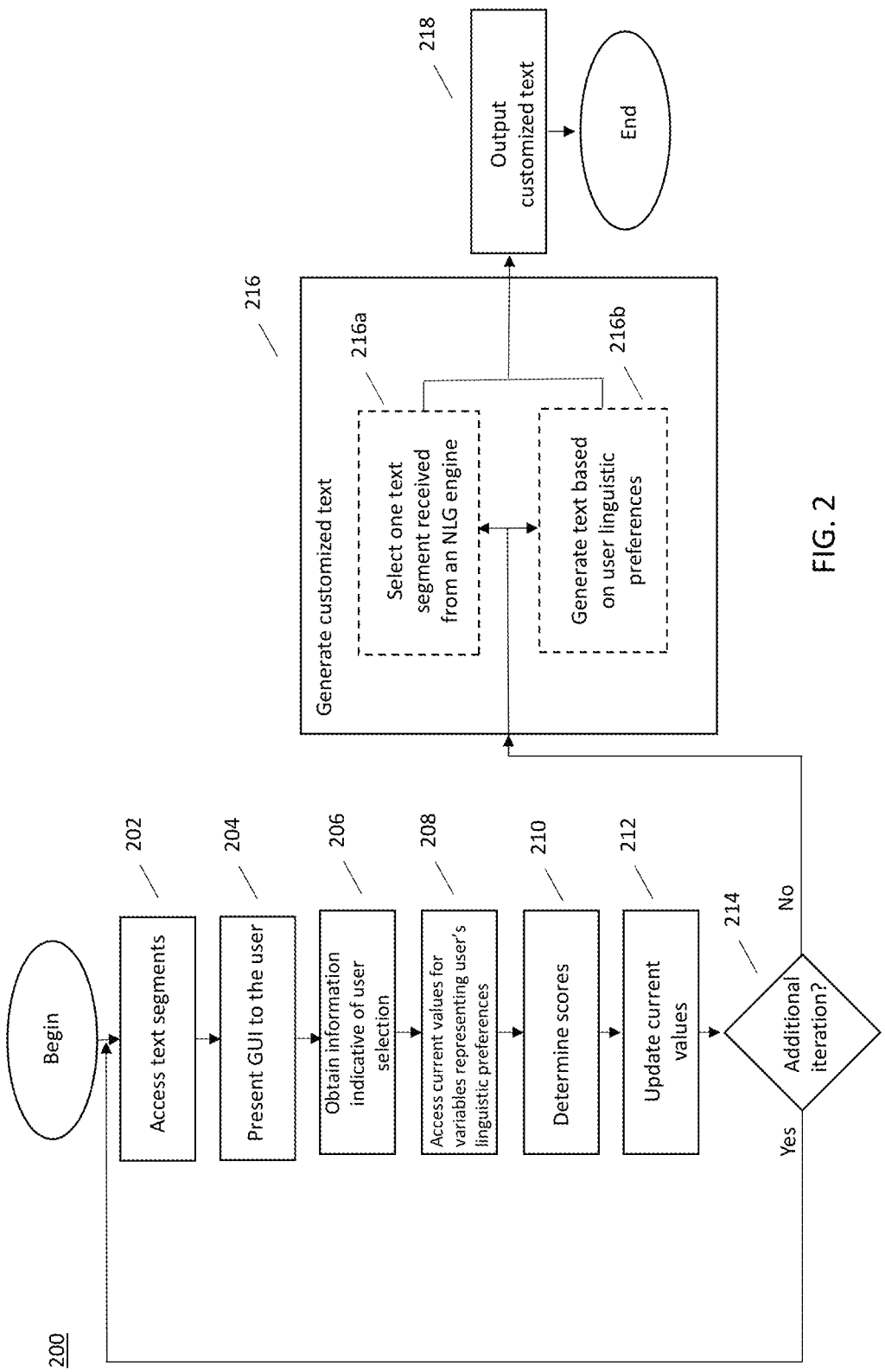
FIG. 2 is a flowchart of an illustrative process for generating natural language text customized to linguistic preferences of a user, in accordance with some embodiments of the technology described herein.

FIG. 2 is a flowchart of an illustrative process for generating natural language text customized to linguistic preferences of a user, in accordance with some embodiments of the technology described herein. In some embodiments, linguistic preference learner 101 performs the illustrative process of FIG. 2, though the process may be performed with any suitable module of an NLG system. The steps of process 200 may be performed in the order depicted in FIG. 2, or in any other suitable order.

At the beginning of process 200, linguistic preference learner 101 may launch a session for a particular user, thereby associating information later obtained during the session to that particular user. Linguistic preference learner 101 may organize information obtained from different users into accounts. Each user has access to an account, and has the ability to interact with linguistic preference learner 101 through the account. As a result, linguistic preference learner 101 can maintain a record of information obtained from a user over multiple sessions. An account may be associated with individuals, or alternatively, with groups of individuals. In some embodiments, for example, multiple users affiliated with a particular organization can share an account, and each user can contribute with his/her personal linguistic preferences. As a result, linguistic preference learner 101 can leverage diverse linguistic preferences in assisting NLG system 100 to generate natural language text for an organization.

At step 202, linguistic preference learner 101 accesses information specifying a plurality of natural language text segments (e.g., sentences). This may be done, for example, by reading text segments from database 140 using database interface module 112. Alternatively, a user may upload a document containing the information using a graphical user interface (GUI), and GUI module 110 may obtain the document from the GUI. The information may be provided as part of a single document or partitioned over multiple documents. Alternatively, a user may utter language describing the text segments. The uttered language may be recorded electronically, may be transcribed to digital text, and may be provided to linguistic preference learner 101. Other ways for accessing the information are also possible.

Each text segment may include a group of words combined to form a phrase, a sentence, an excerpt of a text corpus or other combinations of words. A user may produce the text segments manually, or alternatively, the text segments may be automatically generated using a NLG system. The text segments may express content having some relevance to a particular user. For example, when the user is a financial analyst, the text segments may represent excerpts of a financial report, or when the user is a physician, the text segments may represent excerpts of a medical report.

In some embodiments, the text segments may express the same set of facts or substantially the same set of facts, but may be phrased differently. For example, the text segments may use different synonyms to express the same concept. Additionally, or alternatively, the text segments may use different verb tenses. Additionally, or alternatively, the text segments may use different grammatical structures-some text segments may rely on punctuation to a greater degree than others, and/or may have longer sentences than others. Additionally, or alternatively, the text segments may use different voices-one or more text segments may use the passive voice and one or more text segments may use the active voice. Additionally, or alternatively, the text segments may characterize the same set of facts in different ways. For example, one text segment may characterize a set of facts as positive, and another text segment may characterize the same set of facts as neutral or moderately negative. The text segments may differ from one another in other respects.

FIG. 3 illustrates examples of text segments that linguistic preference learner 101 may access at step 202. In this example, the plurality of text segments are provided in a single text document, but not all embodiments are limited in this respect. Further, in this example, linguistic preference learner 101 accesses information specifying five text segments. However, any other suitable number of text segments may be accessed at step 202.

In this example, each text segment represents a sentence. The sentences are the following:

1. Corporation A's spendable cash and investments to total debt is moderate at 0.98× and has remained flat over the last five fiscal years as a result of a stagnation in debt.

2. Corporation A's moderate spendable cash and investments to total debt of 0.98× was flat over the last five fiscal years due to total debt that remained stable.

3. Corporation A's spendable cash and investments to total debt is moderate at 0.98× and has stayed stable over the last five fiscal years in a stagnation in total debt.

4. Corporation A's spendable cash and investments to total debt is moderate at 0.98× and flat over the last five fiscal years as a result of a stagnation in total debt.

5. Corporation A's spendable cash and investments to total debt is moderate at 0.98× and has stayed stable over the last five fiscal years due to a stagnation in debt.

In this example, each sentence expresses the same set of facts:

A. Corporation A's spendable cash and investments to total debt is moderate.

B. Corporation A's spendable cash and investments to total debt is 0.98×, and

C. Corporation A's spendable cash and investments to total debt was flat over the last five fiscal years because of a stagnation in debt.

However, the sentences adopt different linguistic styles. For example, sentences 1-5 use different expressions to convey the fact that Corporation A's spendable cash and investments to total debt was flat over the last five fiscal years. Sentence 1 uses the expression "has remained flat over," sentence 2 uses the expression "was flat over," sentence 3 uses the expression "has stayed stable over," sentence 4 uses the expression "flat over," and sentence 5 uses the expression "has stayed stable over." Additionally, sentences 1-5 use different causal transitions. Sentence 1 uses the transition "as a result of," sentence 2 and 5 use the transition "due to," and sentence 4 uses the transition "as a result of." Additionally, sentences 1-5 use different ways to convey the fact that the spendable cash and investments to total debt is moderate. Sentences 1, 3, 4 and 5 state "Corporation A's spendable cash and investments to total debt is moderate," sentence 2 states "Corporation A's moderate spendable cash and investments to total debt." Additionally, sentences 1-5 use different ways to convey the fact that debt has been stagnant. Sentence 1 and 5 state "stagnation in debt," sentence 2 states "total debt that remained stable," and sentences 3 and 4 state "stagnation in total debt."

Figure 4:
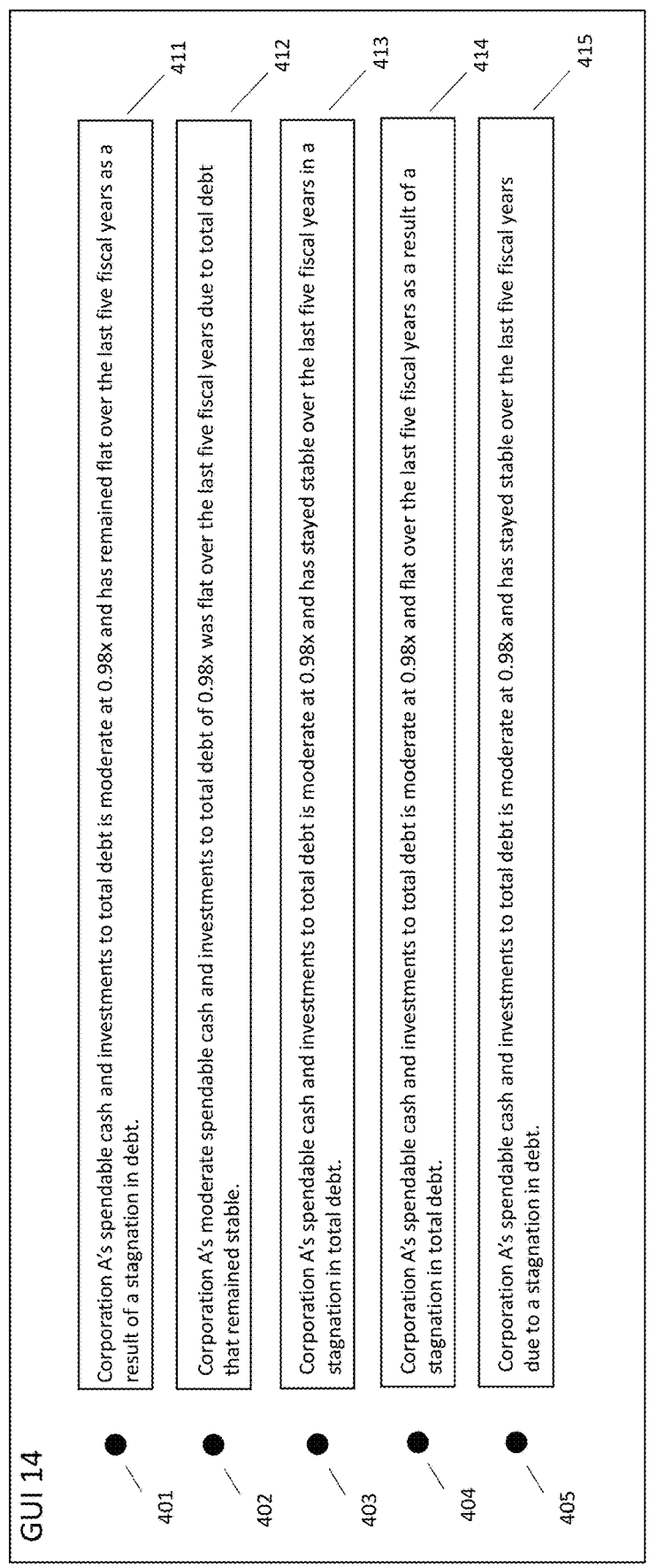
FIG. 4 is a diagram of an illustrative graphical user interface (GUI) providing a plurality of linguistic options to a user, in accordance with some embodiments of the technology described herein.

Referring back to FIG. 2, at step 204, GUI module 110 presents a GUI to the user. The GUI includes a plurality of selectable GUI elements associated with the natural language text segments of step 202. FIG. 4 shows an illustrative example of a GUI. GUI 14 may be presented in any suitable way. For example, it may be displayed in a window of an application or a web browser. GUI 14 includes selectable GUI elements 401, 402, 403, 404 and 405. Each GUI element is associated to one of the text segments of step 202. In the example of FIG. 4, GUI element 401 is associated to sentence 1 of FIG. 3, GUI element 402 is associated to sentence 2, GUI element 403 is associated to sentence 3, GUI element 404 is associated to sentence 4 and GUI element 405 is associated to sentence 5.

GUI 14 further includes GUI fields 411, 412, 413, 414 and 415. Each GUI field may present information about a corresponding text segment. For example, GUI field 411 may include a text field displaying sentence 1, GUI field 412 may include a text field displaying sentence 2, GUI field 413 may include a text field displaying sentence 3, GUI field 414 may include a text field displaying sentence 4 and GUI field 415 may include a text field displaying sentence 5. The GUI elements may be presented in such a way as to inform a user that selection of a particular GUI element causes selection of the text segment of a particular GUI field. For example, GUI item 401 may be visually aligned with GUI field 411, GUI item 402 may be visually aligned with GUI field 412, GUI item 403 may be visually aligned with GUI field 413, GUI item 404 may be visually aligned with GUI field 414 and GUI item 405 may be visually aligned with GUI field 415. The GUI elements may be implemented in any of numerous ways, including for example using checkboxes, radio buttons, dropdown list items, dropdown buttons, toggles, search fields, icons, message boxes or other suitable selectable GUI elements.

In some embodiments, GUI 14 may include a GUI element and a GUI fields for each text segment accessed at step 202. In the example of FIG. 4, GUI 14 includes five GUI elements and five GUI fields. However, in other embodiments, the number of GUI elements and GUI fields may differ from the number of text segments accessed at step 202.

Referring back to FIG. 2, at step 206, a user selects one or more selectable GUI element(s), resulting in the selection of the corresponding text segment(s). The user may select one or more text segments based on the user's personal linguistic preferences. For example, a user may identify that a particular text segment appears to reflect the user's writing style more closely than the other text segments, and may select that particular text segment. Thus, at step 206, GUI module 110 obtains information indicating the selectable GUI element(s) selected by the user. As will be described in detail further below, linguistic preference learner 101 may use the information obtained at step 206 to improve its understanding of the linguistic preferences of the user. In the example of FIG. 2, sentence 5 is highlighted to indicate that the user has selected that particular sentence.

At step 208, database interface module 112 accesses current values for a plurality of variables associated with the user. Each variable may represent a certain linguistic preference associated with the user. In some embodiments, the values are generated based on previous iterations of process 200. However, when the current iteration of process 200 is the first time that the user has interacted with linguistic preference learner 101, the values may be zero. Linguistic preference learner 101 may maintain a data structure including the variables representing the linguistic preferences and the corresponding values. FIG. 5A illustrates a generic data structure including multiple variables representing linguistic preferences and corresponding values. FIG. 5B illustrates a specific example of such a data structure. In this example, the data structure includes the following variables:

Number of words: represents the number of words per sentence.

Number of complex words: represents the number of complex words per sentence, where the complexity of a word can be defined using different criteria.

Verb to be: represents the usage of the verb "to be."

Auxiliary verbs: represents the usage of auxiliary verbs.

Conjunction: represents the usage of conjunctions.

Pronoun: represents the usage of pronouns.

Preposition: represents the usage of prepositions.

Begins with pronoun: represents the number of sentences that begin with a pronoun.

Begins with interrogative: represents the number of sentences that begin with a interrogative.

Begins with article: represents the number of sentences that begin with an article.

Begins with subordination: represents the number of sentences that begin with a subordination.

Begins with conjunction: represents the number of sentences that begin with a conjunction.

Begins with preposition: represents the number of sentences that begin with a preposition.

Wh-determiners: represents the usage of wh-determiners.

Past tense: represents the usage of verbs in the past tense.

Present tense: represents the usage of verbs in the present tense.

In some embodiments, the data structure may include other linguistic variables that are not shown in FIG. 5, including for example any linguistic preference of the following list:

Word Length: represents the average number of characters per word.

Syllable Per Word: represents the average number of syllables per word.

Sentence Length: represents the average number of words per sentence.

Complex Word Frequency: represents the frequency of words having more than 2 syllables.

Long Word Frequency: represents the frequency of words having more than 6 characters.

Coarse POS Tagger: represents a part-of-speech (POS) tagger with normalization of groups, e.g., that combine all noun tags into one, all verb tags into one, etc.

Function Words: represents the frequency of function words, e.g., words that are not nouns, verbs, adjectives, or adverbs.

K Skip N Word Grams: represents a succession of word grams with window size between them (e.g., trigrams (N=3) with a skip of 1 (K=1)).

Character N Grams: represents groups of N successive characters.

Word Definitions: represents words that have been replaced with synonyms as provided in a certain dictionary.

First Word in Sentence: represents the first word in the sentence.

K Skip N Character Grams: represents a succession of character grams with window size between them (e.g., trigrams (N=3) with a skip of 1 (K=1)).

Leave K Out Character N Grams: represents instances in which all permutations K characters are left out from a word gram of size N.

Leave K Out Word N Grams: represents instances in which all permutations K words are left out from a word gram of size N.

Syntactic features: represents the frequency of usage of auxiliary verbs, prepositions, pronouns, conjunctions, articles and subordination.

Lexical Frequencies: represents (Log scaled) HAL frequencies from English Lexicon Project.

M_N Letter Words: represents words with characters between M and N letters (where M and N are provided as parameters).

New Lines: represents splitting based on contiguous groups of \n character.

POS N Grams: represents groups of N successive Parts-of-Speech.

Punctuation: represents non-alphanumeric or whitespace characters.

Punctuation N Grams: represents sliding windows of punctuation.

Rare Words: represents words appearing once or twice per text.

Sentences: represents full sentence length with punctuation.

Sorted Character N Grams: represents n-grams with characters sorted alphabetically.

Sorted Word N Grams: represents n-grams with words sorted alphabetically.

Named Entities: represents Named Entities as derived from a Named Entity Recognizer module.

Suffices: represents last 3 characters of words.

Syllable Transitions: represents N Grams of syllable numbers.

Vowel M_N Letter Words: represents words with characters between two vowel letters.

Vowel-initial Words: represents words beginning with A, E, I, O, U (or lowercase equivalent).

Word Stems: represents word stems derived from the Porter Stemmer.

Word Stems w/irregular: represents word stems with ability to handle irregular nouns and verbs.

Words Before and After Named Entities: represents the count of words used before and after named entities.

Word vectors: represents Word vectors computed in the context of the NLG system

Word tensors: represents Word tensors computed in the context of the NLG system

GF Semantic Rules: represents semantic rules provided by a particular NLG system.

Other linguistic preferences may additionally or alternatively be included in the data structure, including typographic preferences, grammatical preferences, semantic preferences, syntactic preferences and/or lexical preferences.

The values of the data structure indicate the degree to which a user likes the linguistic preference to which the value is associated. For example, each value may represent the frequency with which the natural language text option(s) that the user has previously selected satisfy the corresponding linguistic preference. An illustrative model for determining which linguistic preferences to consider as part of process 200 is described in detail further below in connection with FIG. 8.

At step 210, scoring module 114 determines a score for each (or at least some) of the text segments accessed at step 202. Linguistic preference learner 101 determines the scores based on i) the GUI element(s) that the user selected at step 206, and ii) the current values for the plurality of variables representing linguistic preferences accessed at step 208. FIG. 6 illustrates an example in which linguistic preference learner 101 has determined scores for each of the text segments of FIG. 3. The score determination may be made so that the scores reflect the degree to which the user prefers each text segment. Optionally, at step 210, ranking module 116 ranks the text segments against one another based on the relative scores. Different scoring algorithms may be used at step 210, including for example Learning-to-Rank algorithms or other machine-learned ranking algorithms. In one example, a Particle-Swarm Optimization algorithm may be used for the scoring. The algorithm may include the following steps:

1) linguistic preference learner 101 computes bounds of the coordinate space of the linguistic preferences;

2) linguistic preference learner 101 computes a centroid (e.g., KMeans centroid) within the bounds;

3) linguistic preference learner 101 generate a swarm of set values for the linguistic preference; and 4) linguistic preference learner 101 iterates until convergence toward centroid using Euclidean distance is reached.

In more complex scenarios, for example those including complex text segments, deep learning algorithms may be used for the scoring. For example, linguistic preference learner 101 may use algorithms based on Generative Adversarial Networks and/or on reward policies.

At step 212, linguistic preference determination module 118 updates at least some of the current values using the scores determined at step 210. For example, linguistic preference determination module 118 may update the current values based on how the different text segments rank relative to each other. In some embodiments, the updating involves determining new values for the plurality of variables representing linguistic preferences, and combining the new values with the values accessed at step 208. An example is illustrated in FIG. 7, where the row labeled "prior values" denotes the values accessed at step 208, the row labeled "current values" denotes the new values-those obtained using the scores, and the row labeled "updated values" denote values obtained based on both the prior values and the current values. In some embodiments, the updated values are obtained by adding the prior values to the current values. In some embodiments, linguistic preference learner 101 replaces the values accesses at step 208 with the updated values. Thus, step 208 of the next iteration of process 200 will involve accessing the updated values, not the prior values.

At step 214, linguistic preference learner 101 determines whether to perform an additional iteration of process 200. For example, linguistic learner 101 may ask whether the user would like to select more text segments. If linguistic preference learner 101 determines to perform another iteration, process 200 moves back to step 202, in which linguistic preference learner 101 accesses a new set of text segments. The new iteration may be performed as part of the same session as the previous iteration, or at a later time during another session. In some embodiments, the text segments of the new set describe a different set of facts relative to the text segments accessed in the previous iteration of process 200. This allows linguistic preference learner 101 to determine new scores that are uncorrelated from the scores determined in the previous iteration, thus improving the system's overall ability to learn the linguistic preferences of the user.

However, if linguistic preference learner 101 determines not to perform another iteration, process 200 moves to step 216, in which NLG system interface 122 assist NLG module 100 in generating natural language text customized to the user. The text generation of step 216 may be performed using two different approaches (see steps 216a and 216b), though other approaches are also possible. The approach of step 216a involves using NLG system 100 to generate a number of natural language options each describing the same set of facts, and using NLG system interface 122 to select the option that matches more closely the linguistic preference of a user. The selection may be performed without further input from the user. In some embodiments, the plurality of natural language text segments received from NLG system 100 at step 216a describe the same set of facts, but are phrased differently.

In one example, NLG system 100 may generate the following sentences:

1) Corporation A's strategic positioning score is very poor and highlights the lack of meaningful detailed operational and financial planning and forecasting;

2) Corporation A has a very poor strategic positioning score, which highlights the lack of meaningful detailed operational and financial planning and forecasting; and 3) Corporation A's very poor strategic positioning score highlights the lack of meaningful detailed operational and financial planning and forecasting.

NLG system interface 122 may select one of these sentences, and natural language text including this sentence may be generated.

By contrast, the approach of step 216b involves assisting NLG system 100 using NLG system interface 122 from the generation stage. Instead of using the NLG 25 system 100 to generate a number of options, the natural language text that the NLG system generates already reflects the linguistic preferences of a user. Accordingly, instead of generating natural language text making arbitrary linguistic choices, the generated natural language text is consistent with the user's preferences.

At step 218, NLG system 100 outputs the natural language text generated at step 216. For example, the NLG system may generate one or more documents including the text, may display the text on a screen, and/or may prepare (and optionally send) an email containing the text. Process 200 may end after step 218 has completed.

III. Linguistic Preference Extraction Module

Prior to performing process 200, linguistic preference learner 101 may determine what linguistic preferences should be considered as part of the learning process. Considering all the possible linguistic preferences may be redundant in some embodiments. Certain linguistic preferences are likely to significantly impact how natural language text is ultimately generated. Other linguistic preferences, however, may have a limited impact. For example, the variable "begins with subordination" may have a significant impact while the impact of the variable "begins with conjugation" may be negligible. By design, in some embodiments, linguistic preference learner 101 will not know a priori which linguistic preferences are likely to affect generation of natural language text.

In some embodiments, linguistic preference learner 101 may perform process 200 using a predefined set of linguistic preferences. In other embodiments, however, linguistic preference learner 101 uses linguistic preference extraction module 120 to refine the set of linguistic preferences to be used with process 200. Any of numerous models may be used to refine the set of linguistic preferences. Some of such models utilize machine learning techniques and/or regression-based analyses to learn which linguistic preferences are likely to impact the readability of natural language text. Some of such models are described further below.

Figure 8:
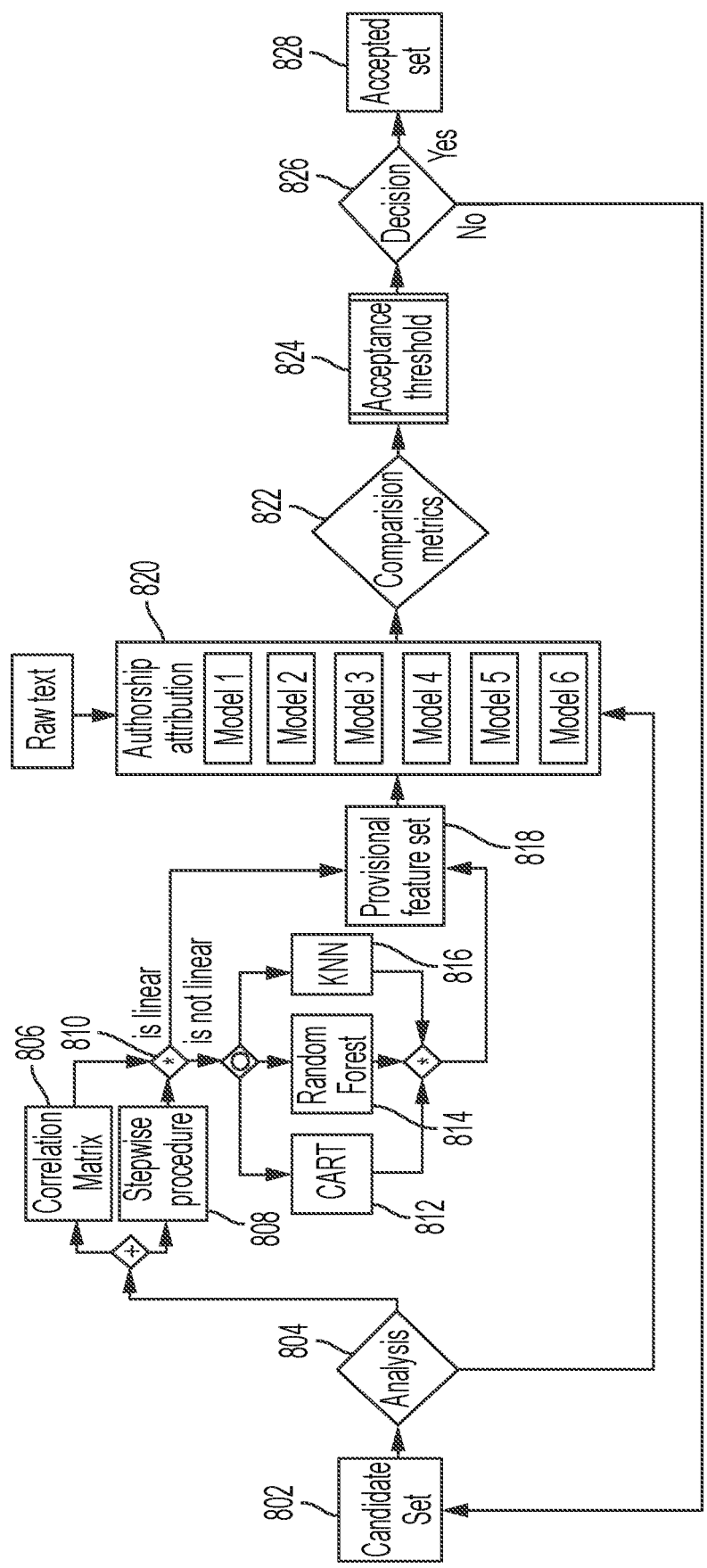
FIG. 8 is an illustrative model for determining which linguistic preferences to consider as part of the process of FIG. 2, in accordance with some embodiments of the technology described herein.

FIG. 8 is a flowchart illustrating an example process for determining what linguistic preferences to consider as part of process 200. Process 800 is performed using linguistic preference extraction module 120. Initially, linguistic preference extraction module 120 produces a candidate set of linguistic preferences (step 802, "candidate set"). For example, linguistic preference extraction module 120 may populate a data structure with a candidate set that includes some (or all) of those listed above in connection with step 208. Subsequently, linguistic preference extraction module 120 may refine the set of linguistic preferences. At step 804 ("analysis"), the candidate set undergoes a regression-based analysis, where the target variable is a readability measure (e.g., Flesh Reading Ease score). In some embodiments, the readability measure is computed in a linear fashion with respect to the candidate set (or a subset thereof). Then, linguistic preference extraction module 120 may perform an analysis from a correlation matrix (step 806, "correlation matrix") and/or a stepwise procedure (step 808, "stepwise procedure"). In some embodiments, steps 806 and 808 are performed in parallel. At step 806, linguistic preference extraction module 120 may generate a correlation matrix with entries representing dependencies between linguistic preferences. Different correlation computations may be used for the matrix, including for example Pearson's correlation coefficient.

In parallel, several methods may be used for the parallel feature selection stepwise procedure of step 808, including for example a Backward Elimination (BE) procedure or a Recursive Feature Elimination (RFE) procedure. In the BE method, the linguistic preferences may be fed to an ordinary least square (OLS) model, which may remove, in a recursive fashion and based on a p-value metric, the worst-performing linguistic preferences. For example, the model may prune linguistic preferences with p-values above 0.05 (or above other suitable values) and continues to iterate until the remaining features have acceptable values.

In the RFE method, linguistic preference extraction module 120 may use a linear regression model with a certain train-test split (e.g., 0.3) to remove attributes in a recursive fashion and to regenerate a new model based on the remaining attributes. The linguistic preferences may be scored and ranked using an accuracy metric based on their importance, and may be fed as inputs to the model. The model may identify which linguistic preferences to keep and which linguistic preferences to drop based on the relative scores or the ranking.

At step 810, linguistic preference extraction module 120 compares linguistic preferences resulting from step 808 with linguistic preferences marked at step 806 with low correlation coefficients to ensure consistency.

The algorithm may run until an optimum number of linguistic preferences has survived and a linear model exists.

If the linear assumptions are not valid for a given occurrence of candidate set of linguistic preferences provided by step 802, linguistic preference extraction module 120 may perform another method for selecting linguistic preferences using a different machine learning model, such as, decision tree regression (e.g., CART, see step 812, labeled "CART"), random forest regression (step 814, "random forest"), and/or KNN regression (step 816, "KNN"). Other models may additionally, or alternatively, be used. Regardless of the model utilized, the linguistic preference selection method may be recomputed on a certain train-test split (e.g., between 0.45 and 0.55, such as 0.5) and a k-fold cross-validation set (e.g., k=5), using bagging or boosting methods. This ensures consistency of the feature selection method between different linguistic preferences.

The algorithm may run until an optimum number of linguistic preferences has survived Subsequently, linguistic preference extraction module 120 determines a target score, using a machine learning algorithm, based for example on any one of the methods described above.

In some embodiments, the process may be analyzed over several different corpora to maintain impartiality. The prediction accuracy may be measured, for example, using a Mean Absolute Error (MAE) score and/or a Root Mean Squared Error (RMSE) score.

In some embodiments, once a provisional set of linguistic preferences has been selected (step 818, "provisional feature set"), linguistic preference extraction module 120 may perform an additional classification-based analysis. Using the same corpora as test subjects, linguistic preference extraction module 120 may use authorship attribution to determine whether the selected set of linguistic preferences can support different text styles (step 820, "authorship distribution").

Subsequently, linguistic preference extraction module 120 may introduce new portions of unlabeled text (identified as "raw text") in FIG. 8, and may perform predictions on the text source using the selected linguistic preferences as parameters. If the predictions are sound and the software is able to trace back the correct source for each text, then linguistic preference extraction module 120 deems the selected set of linguistic preferences as reliable. Different models may be used for the validation, including any combination of the following models:

- high dimensional clustering (e.g., including KMEANS). (See FIG. 8, model 1).
- k-nearest neighbors algorithms. (See model 2).
- latent Dirichlet allocation. (See model 3).
- Markov chains. (See model 4).
- decision trees (e.g., CART) and/or random forest. (See model 5).
- multilayer perceptron. (See model 6).

At step 822 ("comparison metrics"), linguistic preference extraction module 120 compares the outputs of the models. Any suitable comparison metric may be used, including for example precision, recall, and average F1 score. In some embodiments, a runtime metric may be used (the runtime metric may be translated to a % ratio, a value between 0 and 1, where a value equal to 1 indicates the total runtime of the entire application). In some embodiment (if no authorship attribution step is performed), MAE or RMSE may be used. At step 824 ("acceptance threshold"), an acceptance threshold may be selected in any suitable way, including for example according to the following conditions:

- at least one of the models has a F1 or RMSE score greater than a certain value (e.g., 0.9), and
- the at least one models having a F1 or RMSE score greater than the certain value has a runtime ratio less than a certain value (e.g., 0.30).

In some embodiments, including a runtime metric at step 824 may ensure that the set of linguistic preferences can operate in a real-world applications without slowing down the application too significantly.

If at least one model satisfies the conditions (step 826, "decision"), the candidate set of linguistic preferences is accepted (step 828, "accepted set"), otherwise a different candidate set is chosen. The accepted candidate set of linguistic preferences is subsequently used as part of process 200 (see FIG. 2).

IV. Implementation Details

Figure 9:
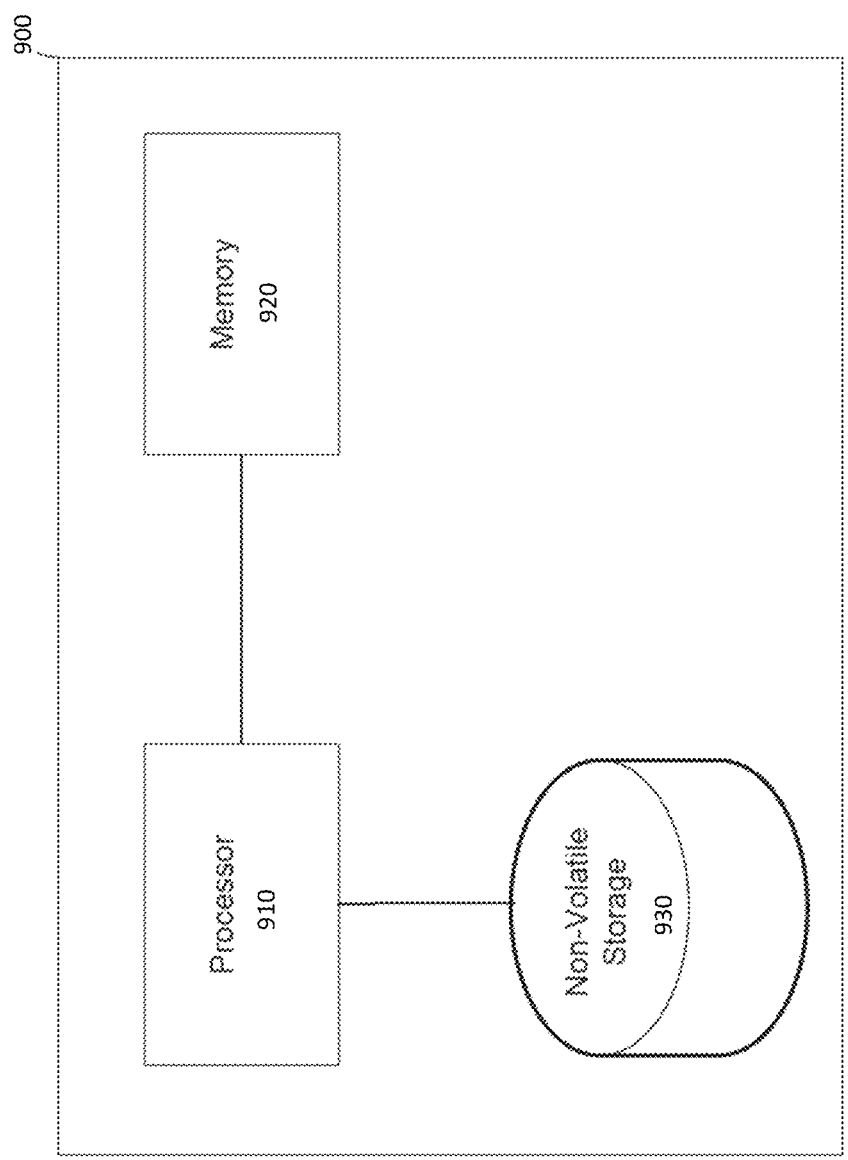
FIG. 9 is a block diagram of an illustrative computer system that may be used in implementing some embodiments.

An illustrative implementation of a computer system 900 that may be used in connection with any of the embodiments of the disclosure provided herein is shown in FIG. 9. The computer system 900 may include one or more processors 910 and one or more articles of manufacture that comprise non-transitory computer-readable storage media (e.g., memory 920, one or more non-volatile storage media 930, etc.). The processor 910 may control writing data to and reading data from the memory 920 and the non-volatile storage device 930 in any suitable manner, as the aspects of the disclosure provided herein are not limited in this respect. To perform any of the functionality described herein, the processor 910 may execute one or more processor-executable instructions stored in one or more non-transitory computer-readable storage media (e.g., the memory 920), which may serve as non-transitory computer-readable storage media storing processor-executable instructions for execution by the processor 910.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., FIG. 4) has been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for generating natural language text customized to linguistic preferences of a user, the method comprising:

using at least one computer hardware processor to perform:
determining the linguistic preferences of the user at least in part by:
accessing a first plurality of natural language text segments;
accessing current values for a plurality of variables representing the linguistic preferences of the user;
presenting, to the user, a first graphical user interface (GUI) comprising a first plurality of selectable GUI elements, each of at least some of the first plurality of selectable GUI elements being associated with a corresponding natural language text segment in the first plurality of natural language text segments;
obtaining, via the first GUI, a first selection made by the user of at least one of the first plurality of selectable GUI elements in the first GUI;
determining a respective first score for each of at least some of the first plurality of natural language text segments to obtain first scores, the determining performed using:
the first selection, and
at least one of the current values for the plurality of variables representing the linguistic preferences of the user; and
determining updated values for the plurality of variables representing the linguistic preferences of the user using the first scores and at least some of the current values;
generating natural language text customized to the user using the updated values; and
outputting the natural language text customized to the user.

2. The method of claim 1, wherein generating the natural language text comprises:
receiving, from a natural language generation (NLG) system, a second plurality of natural language text segments;
selecting at least one text segment from the second plurality of natural language segments using the updated values for the plurality of variables representing the linguistic preferences of the user; and
including the at least one text segment in the natural language text.

3. The method of claim 1, wherein generating the natural language text comprises:
providing the updated values for the plurality of variables representing the linguistic preferences of the user to a natural language generation (NLG) system; and
generating, with the NLG system and using the updated values for the plurality of variables representing the linguistic preferences of the user, the natural language text.

4. The method of claim 1, wherein determining the plurality of linguistic preferences of the user further comprises:
prior to generating the natural language text customized to the user:
presenting, to the user, a second GUI comprising a second plurality of selectable GUI elements, each of at least some of the second plurality of selectable GUI elements being associated with a corresponding natural language text segment in a second plurality of natural language text segments different from the first plurality of natural language text segments;

obtaining, via the second GUI, a second selection made by the user of at least one of the second plurality of selectable GUI elements in the second GUI;
determining a respective second score for each of at least some of the second plurality of text segments using:
the second selection, and
at least one of the updated values for the plurality of variables representing the linguistic preferences of the user,
wherein determining updated values for the plurality of variables representing the linguistic preferences of the user is performed also using the second scores.

5. The method of claim 4, wherein:
each of the first plurality of natural language text segments represents a first fact pattern, and
each of the second plurality of natural language text segments represents a second fact pattern different from the first fact pattern.

6. The method of claim 1, wherein accessing current values for the plurality of variables representing the linguistic preferences of the user comprises accessing current values for the plurality of variables representing at least one linguistic preference selected among the group consisting of a typographic preference, a syntactic preference, and a lexical preference, and
wherein generating the natural language text comprises generating, using the current values for the plurality of variables representing at least one linguistic preference selected among the group, the natural language text.

7. The method of claim 1, wherein accessing current values for the plurality of variables representing the linguistic preferences of the user comprises accessing current values for the plurality of variables representing at least one linguistic preference selected among the group consisting of:
a number of syllables per word,
a number of characters per word,
a number of words per sentence,
a number of characters per sentence,
a number of words beginning with a vowel per sentence,
a number of lines per sentence,
a number of irregular words,
a number of verbs expressed in past tense,
a number of verbs expressed in present tense, and
a frequency of words appearing at least twice in a same sentence, and
wherein generating the natural language text comprises generating, using the current values for the plurality of variables representing at least one linguistic preference selected among the group, the natural language text.

8. The method of claim 1, wherein the current values for the plurality of variables representing the linguistic preferences of the user are stored in a data structure associated with the user, the data structure comprising a set of fields storing the current values.

9. The method of claim 1, wherein determining updated values for the plurality of variables representing the linguistic preferences of the user comprises:
selecting a subset of the first plurality of text segments using the at least some of the first scores; and
updating, using the selected subset of text segments, at least some of the current values to obtain updated values for the plurality of variables representing the linguistic preferences of the user.

10. The method of claim 9, wherein selecting a subset of the first plurality of text segments using the at least some of the first scores comprises selecting the text segments having the highest N scores, with N>1.

11. The method of claim 9, wherein determining updated values for the plurality of variables representing the linguistic preferences of the user comprises:
counting frequencies with which each of at least some of the selected subset of text segments satisfies the linguistic preferences of the user.

12. A system for generating natural language text customized to linguistic preferences of a user, the system comprising:
at least one computer hardware processor to perform:
determining the linguistic preferences of the user at least in part by:
accessing a first plurality of natural language text segments;
accessing current values for a plurality of variables representing the linguistic preferences of the user;
presenting, to the user, a first graphical user interface (GUI) comprising a first plurality of selectable GUI elements, each of at least some of the first plurality of selectable GUI elements being associated with a corresponding natural language text segment in the first plurality of natural language text segments;
obtaining, via the first GUI, a first selection made by the user of at least one of the first plurality of selectable GUI elements in the first GUI;
determining a respective first score for each of at least some of the first plurality of natural language text segments to obtain first scores, the determining performed using:
the first selection, and
at least one of the current values for the plurality of variables representing the linguistic preferences of the user; and
determining updated values for the plurality of variables representing the linguistic preferences of the user using the first scores and at least some of the current values;
generating natural language text customized to the user using the updated values; and
outputting the natural language text customized to the user.

13. The system of claim 12, wherein generating the natural language text comprises:
receiving, from a natural language generation (NLG) system, a second plurality of natural language text segments;
selecting at least one text segment from the second plurality of natural language segments based on the updated values for the plurality of variables representing the linguistic preferences of the user; and
including the at least one text segment in the natural language text.

14. The system of claim 12, wherein generating the natural language text comprises:
providing the updated values for the plurality of variables representing the linguistic preferences of the user to a natural language generation (NLG) system; and
generating, with the NLG system and based on the updated values for the plurality of variables representing the linguistic preferences of the user, the natural language text.

15. The system of claim 12, wherein determining the plurality of linguistic preferences of the user further comprises:

prior to generating the natural language text customized to the user:
presenting, to the user, a second GUI comprising a second plurality of selectable GUI elements, each of at least some of the second plurality of selectable GUI elements being associated with a corresponding natural language text segment in a second plurality of natural language text segments different from the first plurality of natural language text segments;
obtaining, via the second GUI, a second selection made by the user of at least one of the second plurality of selectable GUI elements in the second GUI;
determining a respective second score for each of at least some of the second plurality of text segments using:
the second selection, and
at least one of the updated values for the plurality of variables representing the linguistic preferences of the user,
wherein determining updated values for the plurality of variables representing the linguistic preferences of the user is performed also using the second scores.

16. The system of claim 15, wherein:
each of the first plurality of natural language text segments represents a first fact pattern, and
each of the second plurality of natural language text segments represents a second fact pattern different from the first fact pattern.

17. At least one non-transitory computer-readable storage medium storing processor-executable instructions that, when executed by at least one processor, cause the at least one processor to perform a method for generating natural language text customized to linguistic preferences of a user, the method comprising:
using at least one computer hardware processor to perform:
determining the linguistic preferences of the user at least in part by:
accessing a first plurality of natural language text segments;
accessing current values for a plurality of variables representing the linguistic preferences of the user;
presenting, to the user, a first graphical user interface (GUI) comprising a first plurality of selectable GUI elements, each of at least some of the first plurality of selectable GUI elements being associated with a corresponding natural language text segment in the first plurality of natural language text segments;
obtaining, via the first GUI, a first selection made by the user of at least one of the first plurality of selectable GUI elements in the first GUI;
determining a respective first score for each of at least some of the first plurality of natural language text segments to obtain first scores, the determining performed using:
the first selection, and
at least one of the current values for the plurality of variables representing the linguistic preferences of the user; and
determining updated values for the plurality of variables representing the linguistic preferences of the user using the first scores and at least some of the current values;
generating natural language text customized to the user using the updated values; and
outputting the natural language text customized to the user.

18. The at least one non-transitory computer-readable storage medium of claim 17, wherein generating the natural language text comprises:
receiving, from a natural language generation (NLG) system, a second plurality of natural language text segments;
selecting at least one text segment from the second plurality of natural language segments based on the updated values for the plurality of variables representing the linguistic preferences of the user; and
including the at least one text segment in the natural language text.

19. The at least one non-transitory computer-readable storage medium of claim 17, wherein generating the natural language text comprises:
providing the updated values for the plurality of variables representing the linguistic preferences of the user to a natural language generation (NLG) system; and
generating, with the NLG system and based on the updated values for the plurality of variables representing the linguistic preferences of the user, the natural language text.

20. The at least one non-transitory computer-readable storage medium of claim 17, wherein determining the plurality of linguistic preferences of the user further comprises:
prior to generating the natural language text customized to the user:
presenting, to the user, a second GUI comprising a second plurality of selectable GUI elements, each of at least some of the second plurality of selectable GUI elements being associated with a corresponding natural language text segment in a second plurality of natural language text segments different from the first plurality of natural language text segments;
obtaining, via the second GUI, a second selection made by the user of at least one of the second plurality of selectable GUI elements in the second GUI;
determining a respective second score for each of at least some of the second plurality of text segments using:
the second selection, and
at least one of the updated values for the plurality of variables representing the linguistic preferences of the user,
wherein determining updated values for the plurality of variables representing the linguistic preferences of the user is performed also using the second scores.

* * * * *

UNITED STATES PATENT AND TRADEMARK OFFICE
CERTIFICATE OF CORRECTION

| | |
|---|---|
| PATENT NO. | : 11,501,088 B1 |
| APPLICATION NO. | : 16/815205 |
| DATED | : November 15, 2022 |
| INVENTOR(S) | : Dominique Mariko et al. |

It is certified that error appears in the above-identified patent and that said Letters Patent is hereby corrected as shown below:

On the Title Page

Item (71) Applicant:
"Applicant: YSEOP SA, Lyons (FR)"
Should read:
--Applicant: YSEOP SA, Lyon (FR)--

Item (73) Assignee:
"Assignee: YSEOP SA, Lyons (FR)"
Should read:
--Assignee: YSEOP SA, Lyon (FR)--

Signed and Sealed this
Third Day of January, 2023

Katherine Kelly Vidal
*Director of the United States Patent and Trademark Office*